United States Patent Office 3,381,802
Patented May 7, 1968

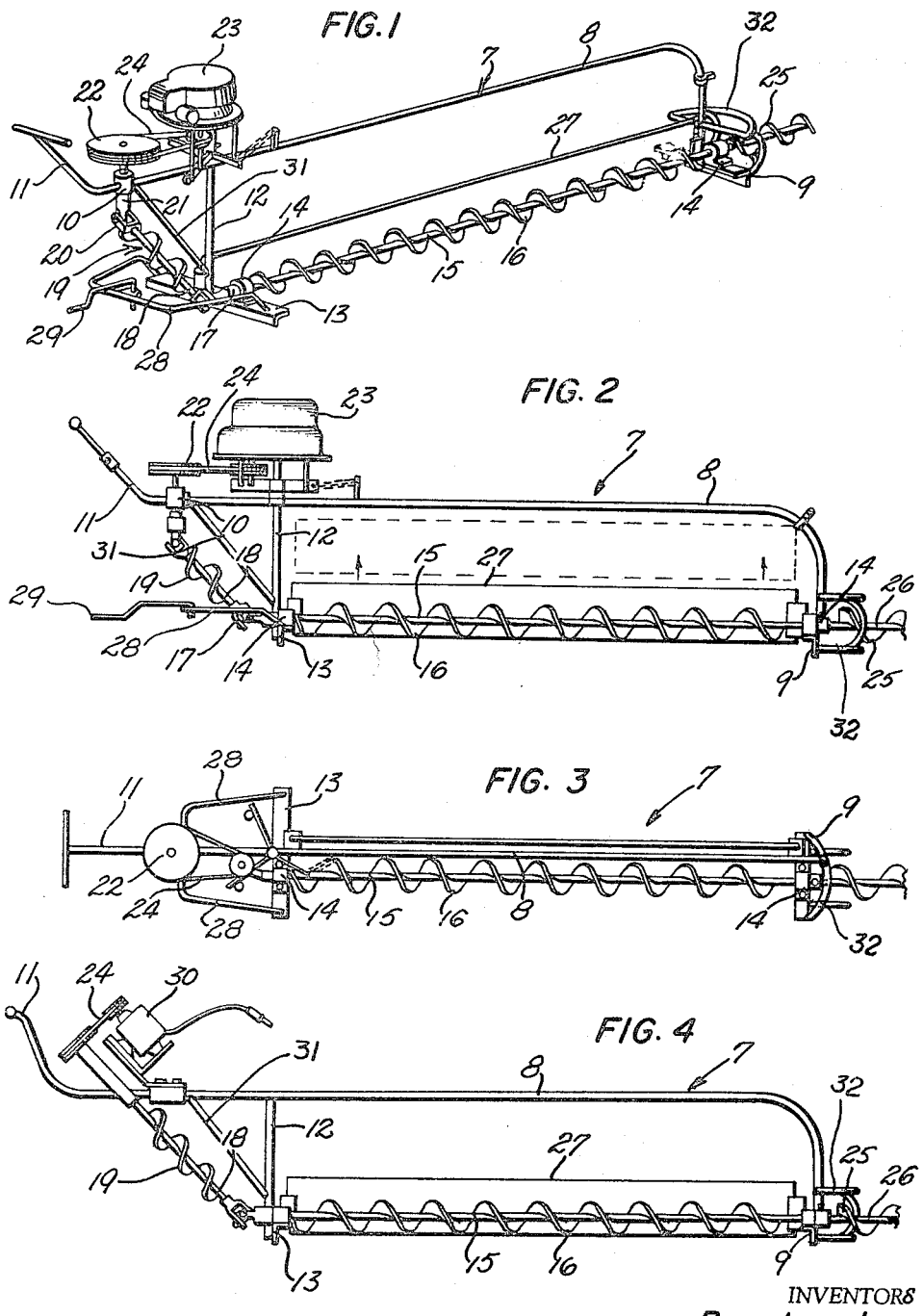

3,381,802
APPARATUS FOR MOVING FRUMENTACEOUS
MATERIALS AND THE LIKE
Roy Levadney, Paul Levadney, and Clarence Levadney,
all of Max, N. Dak. 58759
Filed Dec. 5, 1966, Ser. No. 599,215
4 Claims. (Cl. 198—213)

ABSTRACT OF THE DISCLOSURE

This apparatus includes a novel frame for supporting a three member helical type conveyor and supporting a motor for driving the conveyor members, which frame also supports an elongated sweep member extending along one side of one member of the conveyor.

---

This invention relates to materials moving or handling apparatus, and more particularly, materials that are frumentaceous in nature.

The moving of frumentaceous materials is at the best a laborious and costly job that normally takes considerable time if very much of the material is to be moved or if the moving is from one level of floor to another or from a bin to a truck or railroad car or to a hold of a ship or the like. Mechanical means of reducing the time and cost of moving frumentaceous materials are nearly always complicated and expensive mechanical devices or apparatus that require a number of men to handle.

It is, therefore, the principal object of this invention to provide apparatus for moving frumentaceous materials and the like the apparatus embodying simple light weight mechanism that can be moved about and operated by one man in a minimum of time and with a minimum of effort.

Another object of this invention is to provide an apparatus of the character described that is especially adapted to the moving of any frumentaceous material from one end of any bin or the like to the other end of the bin, or to load and/or unload the material from any desired object.

Another object of this invention is to provide an apparatus for moving frumentaceous materials or the like, the apparatus having one or more revolving helical members that automatically move the material in which the apparatus has been placed, the helical member or members of the apparatus being activated by its motor or engine.

Still another object of this invention is to provide an apparatus for moving frumentaceous materials, the apparatus being equipped with any desired type of activating motor or engine.

Other and further objects and advantages of this invention will come to mind as the reading of this specification proceeds and the appended drawing is examined.

In the drawing:

FIG. 1 is a pictorial view of this invention ready for use.

FIG. 2 is a side view of this invention.

FIG. 3 is a top view of this invention, but with its motor or engine removed for reasons of clarity.

FIG. 4 is a side view of a modified form of this invention, as will hereinafter be described.

In the several views of this invention, like parts are indicated by like reference numbers.

The reference number 7 indicates this invention in its entirety. The invention consists of an L-shaped tubular member 8 that has one end terminating vertically in securement to the top surface of the horizontally disposed member of the angle iron 9 while the other end of the aforesaid tubular member 8 terminates at the junction 10 of the lower end of the T-shaped handle 11. A vertically disposed tubular member 12 extends downward from the underside of the aforesaid member 8 to terminate on the top of the horizontally disposed surface of the second angle iron 13. Each of the aforesaid angle irons 9 and the just mentioned angle iron 13 support one of the bearings 14 through which horizontally extends one end of the horizontally disposed shaft 15 of the helical member 16, which I personally call an auger, that actually moves the frumentaceous material in which this invention is set by reason of the rotation of the auger, as will be fully understood by anyone who examines the appended drawing.

A universal joint 17 connects one end of the aforesaid auger 16 with the lower end of the shaft 18 of the angularly disposed auger 19 that has the upper end of the shaft 18 secured to the universal joint 20 which is also secured to the lower end of the vertically disposed shaft that runs through the bearing 21 to terminate in the center of the large horizontally disposed pulley 22 that is located just above the intersection of the aforesaid L-shaped tubular member 8 and the lower end of the aforesaid T-shaped handle 11. A motor or engine of any desired type 23 is mounted on an extension of the uppermost end of the aforesaid tubular member 12 of this invention. A V-belt 24 transmits rotating power from the aforesaid motor or engine 23 to the aforesaid pulley 22, thereby providing rotatable power to both the previously mentioned angularly disposed auger 19 and to the horizontally disposed auger 16 to which it is rotatably secured, as has previously been described. A third and horizontally disposed auger 25 of any desired length is secured to the outer end of this invention by means of a coupling securing the shaft 26 of auger 25 to the outer end of the aforesaid shaft 15 of auger 16, as is clearly shown in all four views of the appended drawing.

A rectangular metal sweep plate 27 is removably mounted on one side of the aforesaid auger 16, as one can readily see by looking at any of the views of the drawing. A horizontally disposed U-shaped guard bar 28, having a swingably mounted attachment rod 29 on the outer end thereof, is removably mounted on that lower end of this invention to which is secured the angularly disposed auger 19 in order to protect the auger when it is rotating.

The only difference between the above described construction of this invention of mine in its preferred form and that of its modified form, shown in FIGURE 4 of the drawing, is in the mounting of the electric motor 30 in an angularly disposed position that is parallel to the auger 19. Since an electric motor operates in different positions, it is mounted in this way eliminating one universal joint. In this form of this invention, the aforesaid T-shaped handle 11 has a slightly different configuration when viewed from the side, and the U-shaped guard bar 28 and its rod 29 have been left off the invention.

Although not previously mentioned, the two aforesaid angle irons 9 and 13 are at right angle to the L-shaped tubular member 8. It will be noted from examination of FIGURE 3 of the drawing that angle iron 9 is substantially shorter in length than angle iron 13.

Attention is called at this time to the angularly disposed tubular brace 31 that extends from the under and inward side of the aforesaid junction 10 of the tubular member 8 and the T-shaped handle 11 to the lower end of the aforesaid vertically disposed tubular member 12. A guard or protector 32 is located over the outer portion of the aforesaid outer one of the end bearings 14.

The way in which this novel invention of mine for moving frumentaceous materials is used is so obvious from examination of the drawing that no further explanation need be given to even the most inexperienced person in the art of handling materials of a frumentaceous nature.

This invention is subject to any changes and/or modifications one may care to make in so long as the changes and/or modifications fall within the scope and intent of the appended claims.

What we now claim as new and desire to secure by Letters Patent is:

1. An apparatus for moving frumentaceous material and the like comprising a substantially L-shaped tubular member having a portion extending substantially horizontally and a portion extending vertically, a horizontally disposed member secured to the lower end of the vertical member and extending transversely of the L-shaped member to assist in keeping the L-shaped member in a vertical plane, a second vertical portion having its upper end secured to the horizontal portion of the L-shaped member near the free end thereof, a second horizontally disposed member secured to the lower end of the second vertical portion and extending transversely of the L-shaped member to assist the other horizontally disposed member in keeping the L-shaped member in a vertical plane, a horizontally disposed shaft, helical conveyor structure secured to said shaft to form a horizontally disposed conveyor member, bearings for supporting said shaft each bearing secured to a lower portion of one of the vertical portions, a handle secured to the free end of the horizontal portion, a motor secured to the horizontal portion and supported thereby and a drive connection between the motor and the horizontal shaft.

2. The combination of claim 1 in which the handle is T-shaped.

3. The combination of claim 1 in which the drive connection includes an inclined shaft, helical conveyor structure secured to said inclined shaft, a connection between one end of the inclined shaft and one end of the horizontal shaft and a power transmitting connection between the motor and the other end of said inclined shaft.

4. The combination of claim 1 including an elongated rectangular sweep member extending along one side of the horizontal conveyor member and secured to the vertical portions.

References Cited

UNITED STATES PATENTS

| 2,569,871 | 10/1951 | Roscoe | 198—7 |
| 2,606,643 | 8/1952 | Tidwell | 198—213 X |

FOREIGN PATENTS

| 1,055,652 | 10/1953 | France. |
| 672,281 | 2/1939 | Germany. |

EDWARD A. SROKA, *Primary Examiner.*